United States Patent [19]
Hong

[11] Patent Number: 5,531,858
[45] Date of Patent: Jul. 2, 1996

[54] SHRINKABLE LABEL INSERTING MACHINE

[76] Inventor: Chin-Tan Hong, No. 42-35, Shuang-Fu Village, Min-Hsiung Shiang, Chia-I Hsien, Taiwan

[21] Appl. No.: 375,669

[22] Filed: Jan. 20, 1995

[51] Int. Cl.⁶ .................................................. B23B 31/00
[52] U.S. Cl. ............................ 156/556; 156/86; 156/353; 156/443; 156/521; 83/54
[58] Field of Search ............................ 156/86, 215, 521, 156/556, 443, 517, 353; 83/54, 597, 598

[56] References Cited

U.S. PATENT DOCUMENTS 4,412,876 11/1983 Lerner et al. ........................ 156/86 X
4,806,187 2/1989 Fujisawa ................................ 156/86

*Primary Examiner*—James Engel
*Attorney, Agent, or Firm*—Morton J. Rosenberg; David I. Klein

[57] ABSTRACT

A shrinkable label inserting machine with a modified central holder, a driving system, a cutting system, and a loading system is provided. The machine features a central holder having an upper post and a lower post bolted together with a screw and having an annular groove formed where the posts are bolted together. A passage is provided at the base of the lower post through which the top of a bottle is detected by an electric eye. Each of the driving and loading systems include two rollers between which the spacing is adjustable. A cutting system has a circumferential arrangement of a plurality of pulleys, each having a blade affixed thereto, and each pulley is coupled for synchronous movement with a timing belt. The arcs of the blades overlap to ensure a complete ring is cut around the circumference of the shrinkable label.

4 Claims, 21 Drawing Sheets

5,531,858

SHRINKABLE LABEL INSERTING MACHINE

BACKGROUND OF THE INVENTION

Field of the Invention

This invention relates to a shrinkable label inserting machine having a knock-down central holder, an adjustable driving system, an adjustable loading system, and an interchangeable modular cutter system.

Prior Art

Shrinkable label inserting machines currently on market may be generally summarized as each having an integral, sectionless, flat based central holder having an excessive distance between a bottom edge and the bottle, where it will be labeled. Both the driving and the loading rollers are fixed to the frame, with a gap that is not adjustable. Thus, this machine is only usable for one size bottle, or all of the driving and loading rollers, as well as the central holder, must be dismantled and repositioned for other bottle sizes. Such modification involves much effort, many hours, difficulties in achieving calibration and complicated techniques. Such machines employ a cutter featuring a single blade, its side cuts result in such flaws as uneven upper and lower edges, failure to cut, and misaligned cut-off.

To correct the flaws observed in the prior art cutter, a later version has provided the entire cutter placed on a disk, to cut off the shrinkable label by a cycle defined by rotating the disk. As illustrated in FIGS. 15 and 16, the shrinkable label 91 is introduced to the central holder 92, and pulled to the disk 95, which houses the cutter 94, by the driving rollers 93 that are fixed to the frame. The label is then pulled down by the loading roller 97 disposed on the lower section of the central holder 92, while the disk 95 is rotatively driven by the belt 96 to enable the cutter 94 to complete one cycle of rotation, as illustrated in FIG. 16, to cut off the shrinkable label 91 on the central holder 92. However, other flaws of prior art system remain uncorrected by this arrangement.

SUMMARY OF THE INVENTION

This invention relates to a shrinkable label inserting machine. The machine comprises a feeding system, a central holder, a driving system, a cutter system, a loading system, a frame, and a conveyer system. The machine receives the bottle neck in the tunnel provided at the base of the central holder and the shrinkable label is guided directly downward over the bottle. Both the driving system and the loading system are adjustable without the use of tools, while both the central holder and the cutter system can be easily removed for replacement. The central holder is modified to be a knock-down type, with a passage formed laterally in its base. Both the driving and loading systems are modified to allow the respective spacing between two driving rollers and two loading rollers to be adjustable, to either travel away from or sandwich the bearings provided on the central holder. The cutter is designed to be modular, wherein circularly arranged pulleys are provided within the barrel of the cutter system. A blade is fixed to each pulley for cutting the shrinkable label with the blades by rotation of the pulleys. Rotation of the pulleys is activated by a timing belt driven by a stepping motor provided on the frame.

DETAILED DESCRIPTION OF THE PREFERRED EMBODIMENT

Figure 1:
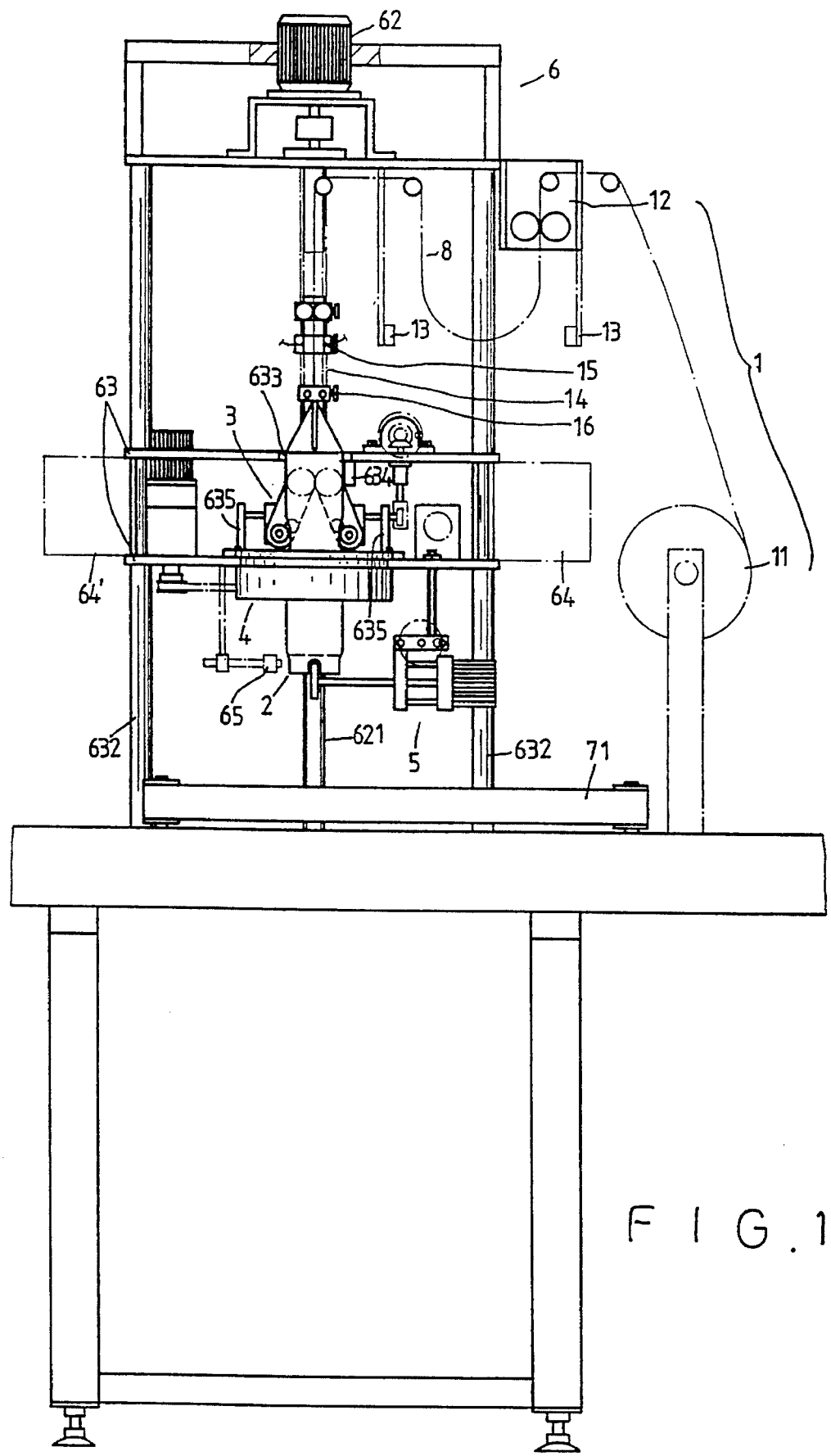
FIG. 1 is a front elevation view of the present invention.
Figure 2:
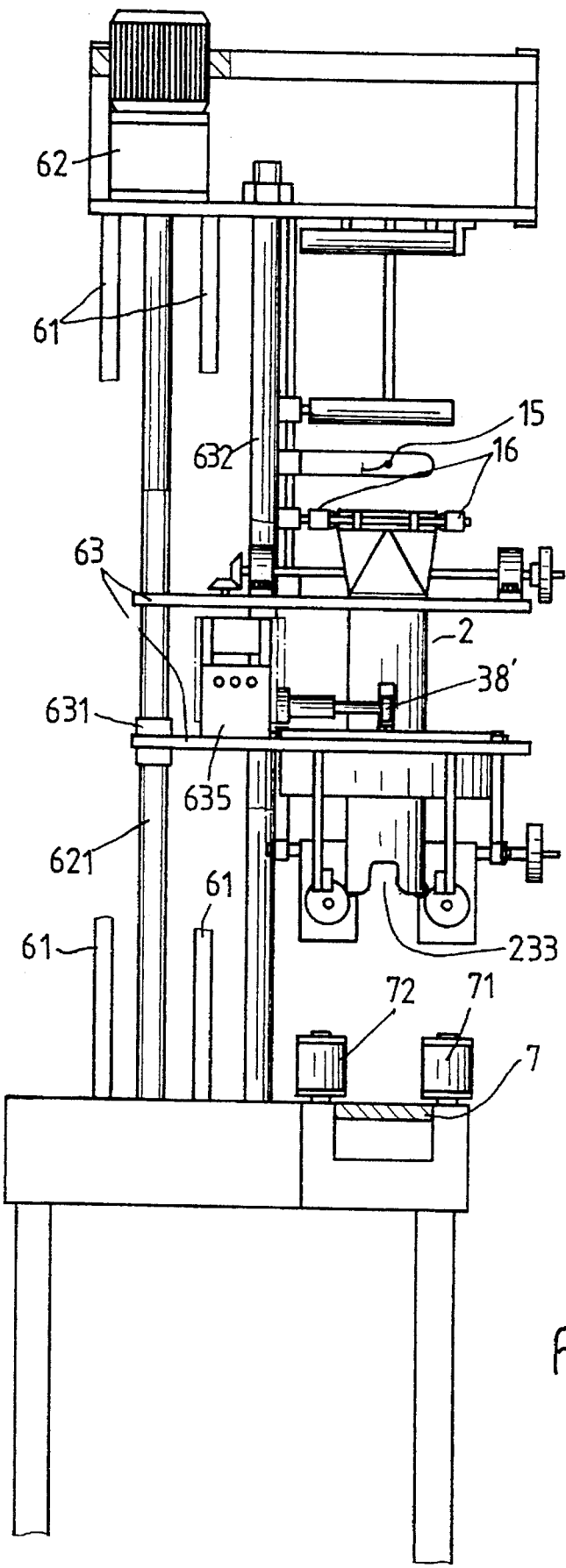
FIG. 2 is a longitudinally sectional view of the present invention.

Referring now to FIGS. 1 and 2, there is shown the preferred embodiment of the present invention, comprising a feeding system 1, a central holder 2, a driving system 3, a cutter system 4, a loading system 5, a frame 6 and a conveyer system 7. The frame 6 supports, at the upper end of supporting rod 61, a motor 62 which is coupled to a screw 621. The screw 621 is connected to a nut 631 disposed at the lower level of a double-level deck 63. The double-level deck 63 has inserted at its opposing sides two vertical guides 632, allowing the double-level deck to be elevated along the guides 632 as the screw 621 is rotated. An opening 633 is provided in the central front portion of the double-level deck 63 to house the central holder 2. A fender 634 extends downward from the underside of the upper level of the double-level deck 63 adjacent to the right side of opening 633. A pair of vertical panels 635 are affixed vertically to opposing sides and behind the opening 633, on the lower level of the double-level deck 63. Control boxes 64 and 64' are respectively fixed to opposing sides of the double-level deck 63.

The feeding system 1 is fixed on the right side of the frame 6 and extends to a position above the double-level deck 63.

The central holder 2 is accommodated within the opening 633 of the double-level deck 63, while the driving system 3 is disposed on the lower level of the double-level deck 63. The cutter system 4 is located in a gap in the lower level of double-level deck 63. The loading system 5 is suspended beneath the lower level of the double-level deck 63, and the conveyer system 7 is disposed below the loading system 5 and the central holder 2. The central holder 2 is sandwiched, and thus supported, by the driving system 3 and the loading system 5. Two positioning belts 71 and 72, that are space and height adjustable, are erected on and synchronized with the conveyer system 7. The feeding system 1 includes a let-off device 11, feeding rollers 12, electric eyes 13 and 15, a positioning device 14 and a pair of stoppers 16. The roll of shrinkable labels 8 is placed on the let-off device 11, and the labels pass around the feeding rollers 12 with a loop of appropriate length for the electric eye 13 to detect, before passing vertically through the positioning device 14 to fall on the central holder 2. Electric eye 15 and two stoppers 16 are affixed to the positioning device 14 with the electric eye picking up the spacing between printed patterns on the shrinkable label 8. The stoppers serve as the positioner for the area above the central holder 2, by limiting the guiding plate 21 disposed above the central holder 2.

Figures 3A, 3B:
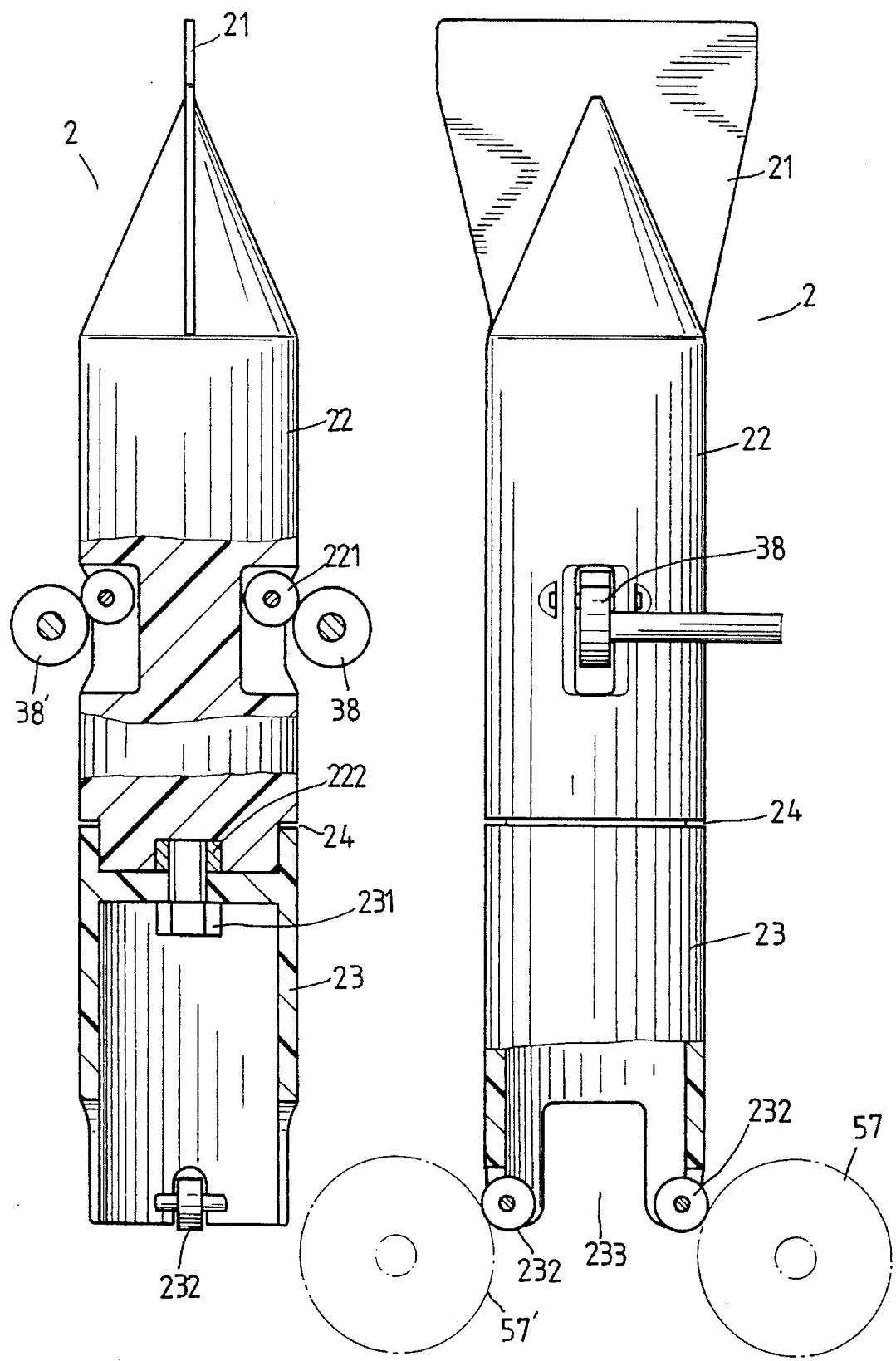
FIG. 3A is a front partially longitudinally sectioned view of the central holder of the present invention.
FIG. 3B is a side view, partially longitudinally sectioned, of the central holder of the present invention.

As illustrated in FIGS. 3A and 3B, the central holder 2 is comprised of a flat guiding plate 21 integrally formed with the upper cylinder 22 to define the upper section of holder 2. The lower post 23 forms the lower section of holder 2. Bearings 221 are disposed respectively on opposite sides of the upper post 22 at proper location. A threaded insert 222 is fixed at the center of the base of the upper post 22, while a bolt 231 extends upward through the center of the upper surface of the lower post 23 and engages the threaded insert 222, to connect both of the upper and the lower posts 22 and 23 into an integral part having a groove 24 formed between the lower and the upper posts 22 and 23. A pair of bearings 232 are respectively provided within the front and rear side of the base of the lower post 23, and a passage 233 is formed laterally through the base of the lower post 23.

Figure 4A:
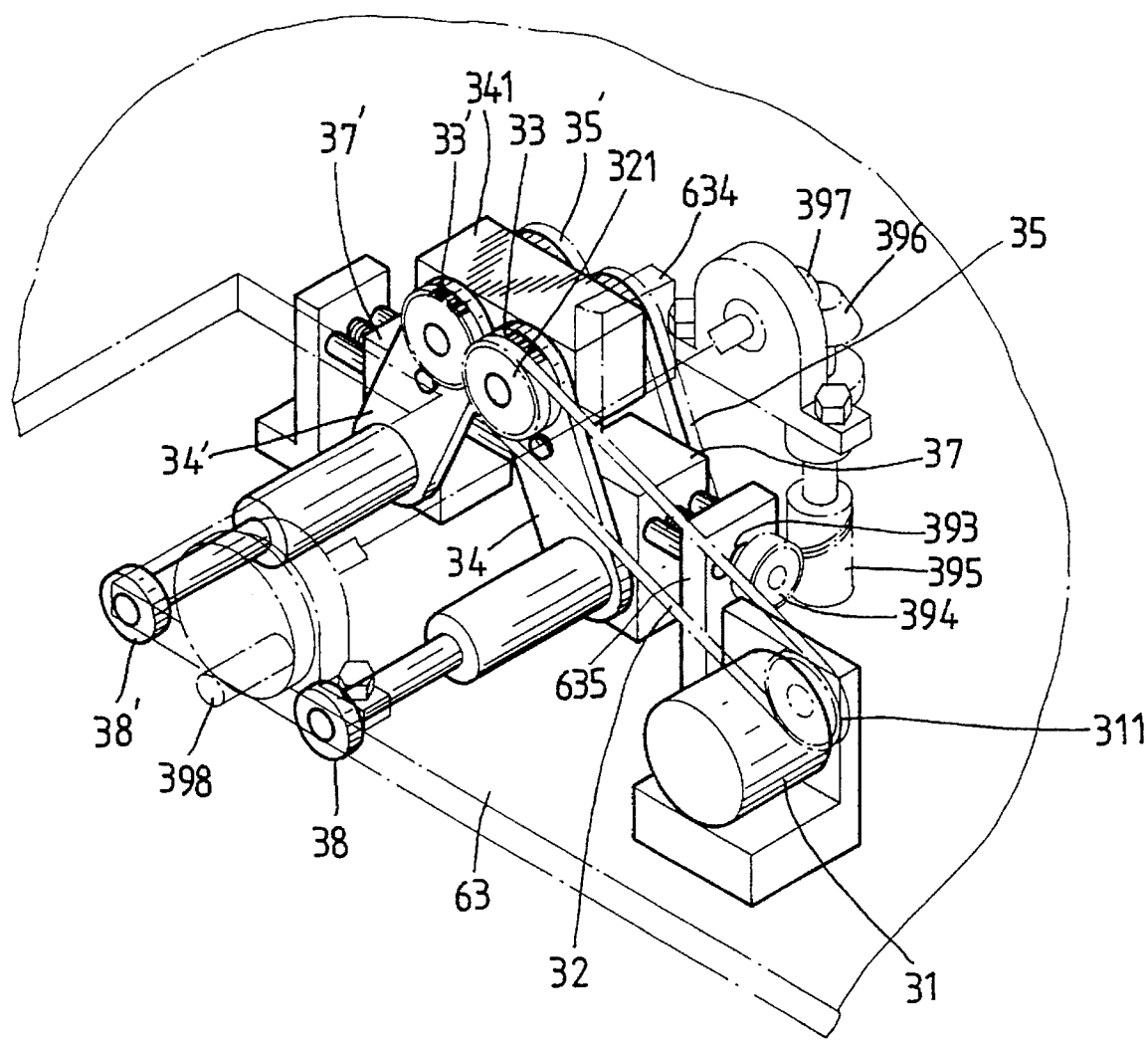
FIG. 4A is an isometric drawing of the driving system of the present invention.
Figure 4B:
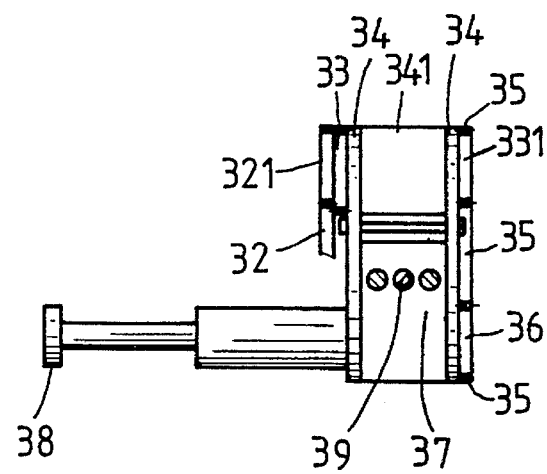
FIG. 4B is a side sectional view of the driving system of the present invention.
Figure 5A:
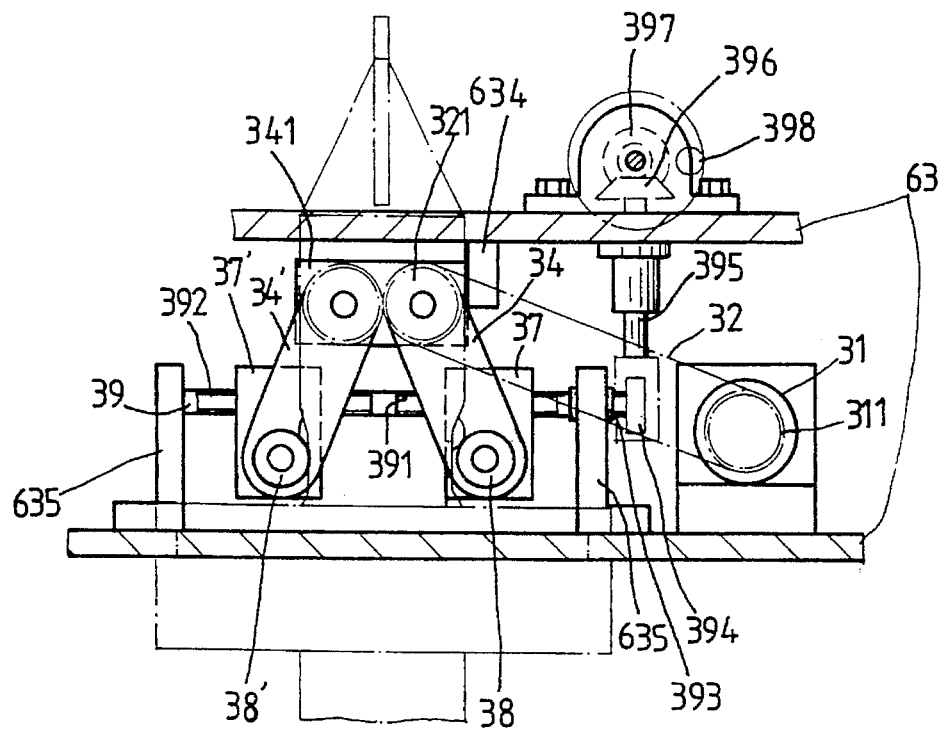
FIG. 5A is an illustration showing the driving system operating in a normal mode.
Figure 5B:
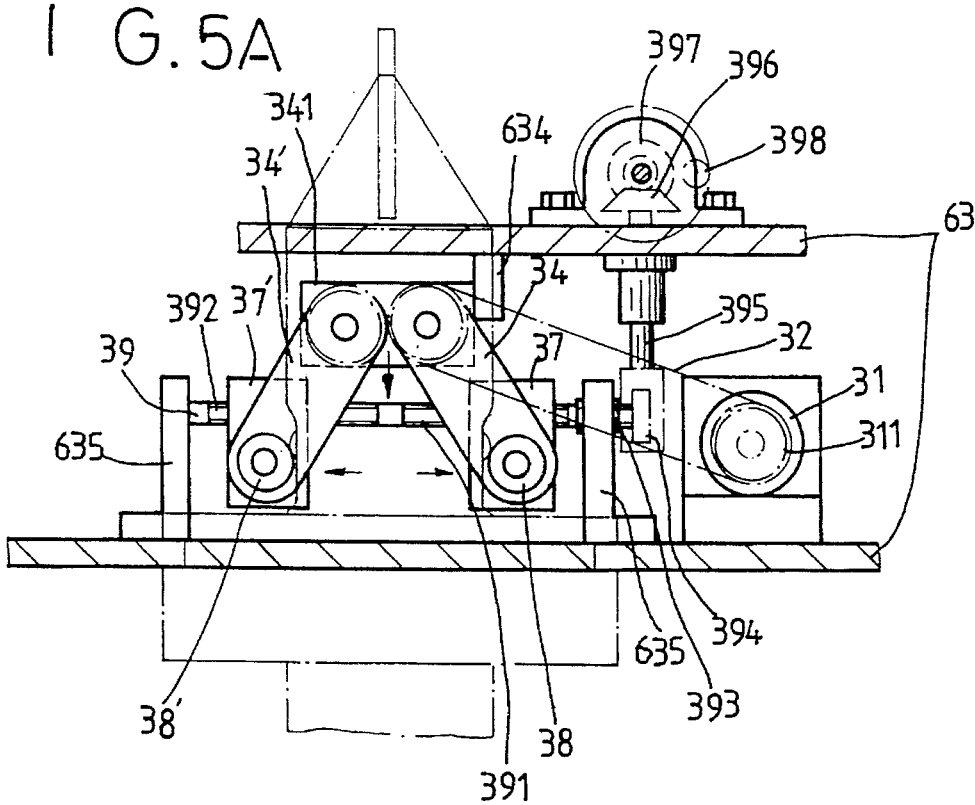
FIG. 5B is an illustration showing the driving system operating in an adjusted mode.

As illustrated in FIGS. 4A, 4B, 5A and 5B, the driving system 3 is comprised of a pulley 311 coupled to the step motor 31 that is fixed onto the double-level deck 63, for driving the timing belt 32. The timing belt 32 is coupled to another pulley 321, and the gear 33 being co-axial with the pulley 321 is engaged with another gear 33'. As illustrated in FIG. 4B (the identical other side is not shown), the other end of each axle is secured to a pulley 331, and each of the axles is pivotally coupled to links 34, 34' and a block 341, which is located at the inner side of the upper links 34 and 34'. Each pulley 331 is coupled to another pulley 36 by a timing belt 35, and one end of the axle of the pulley 36 passes through and is pivotally coupled to the respective sliding block 37, 37', passing to the inner side of the links 34, 34' with the distal end provided with the driving rollers 38 and 38'. As illustrated in FIGS. 3A, 5A and 5B, both driving rollers 38 and 38' are positioned correspondingly against the bearing 221 of the central holder 2. Left and right threads are respectively provided within sliding blocks 37 and 37' to engage a screw 39 that is formed with respective left and right hand threads 391 and 392. The screw 39 is pivotally coupled to the vertical panel 635 located on the right side of the double-level deck 63 through a pair of thrust bearings 393.

One end of the screw 39 is formed with a wormgear 394 engaged with the worm 395. The worm 395 extends through the upper level of the double-level deck 63, to which a bevel gear 396 is coupled. Bevel gear 396 is engaged with another bevel gear 397 that is coupled to the hand wheel 398. Turning hand wheel 398 causes both sliding blocks 37, 37' to move either towards or away from each other through their coupling with screw 39, and further causes both driving rollers 38 and 38' to move either towards or away from each other laterally. The movement of sliding blocks 37 and 37' forces links 34 and 34' to either open or close, using the block 341 as the center. Both engaged gears 33 and 33' are simultaneously rotated relative to the block 341, which is being restricted by the fender 634, and will not escape due to the pull by the pulley 331. However, the change in the distance in the vertical direction taking place during opening or closing by the two links 34 and 34' is insignificant and can be controlled by block 341 with fender 634, and the change in distance in horizontal direction in turn providing the relative displacement of driving rollers 38 and 38' toward or away from the central holder 2.

Figure 6:
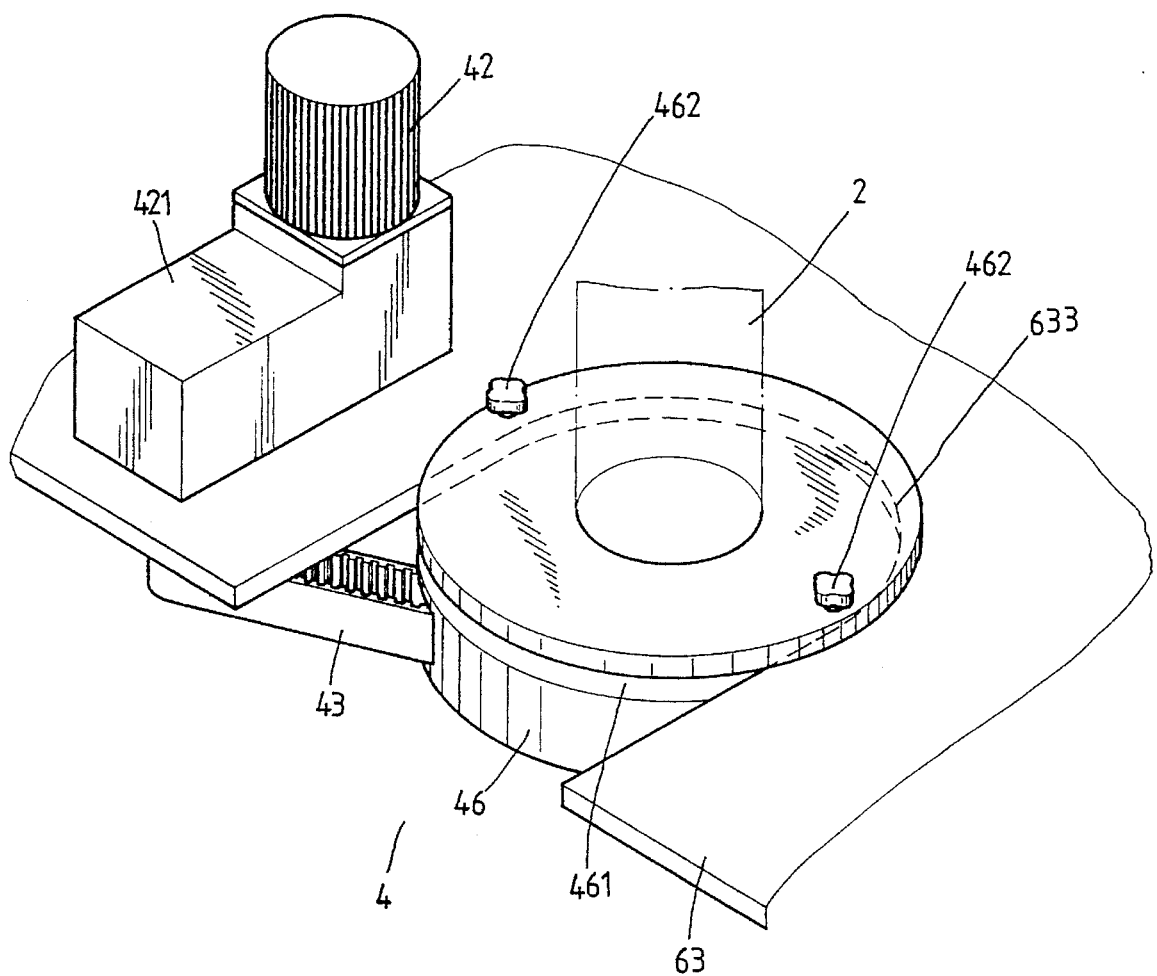
FIG. 6 is a perspective view of the cutter system of the present invention.
Figure 7:
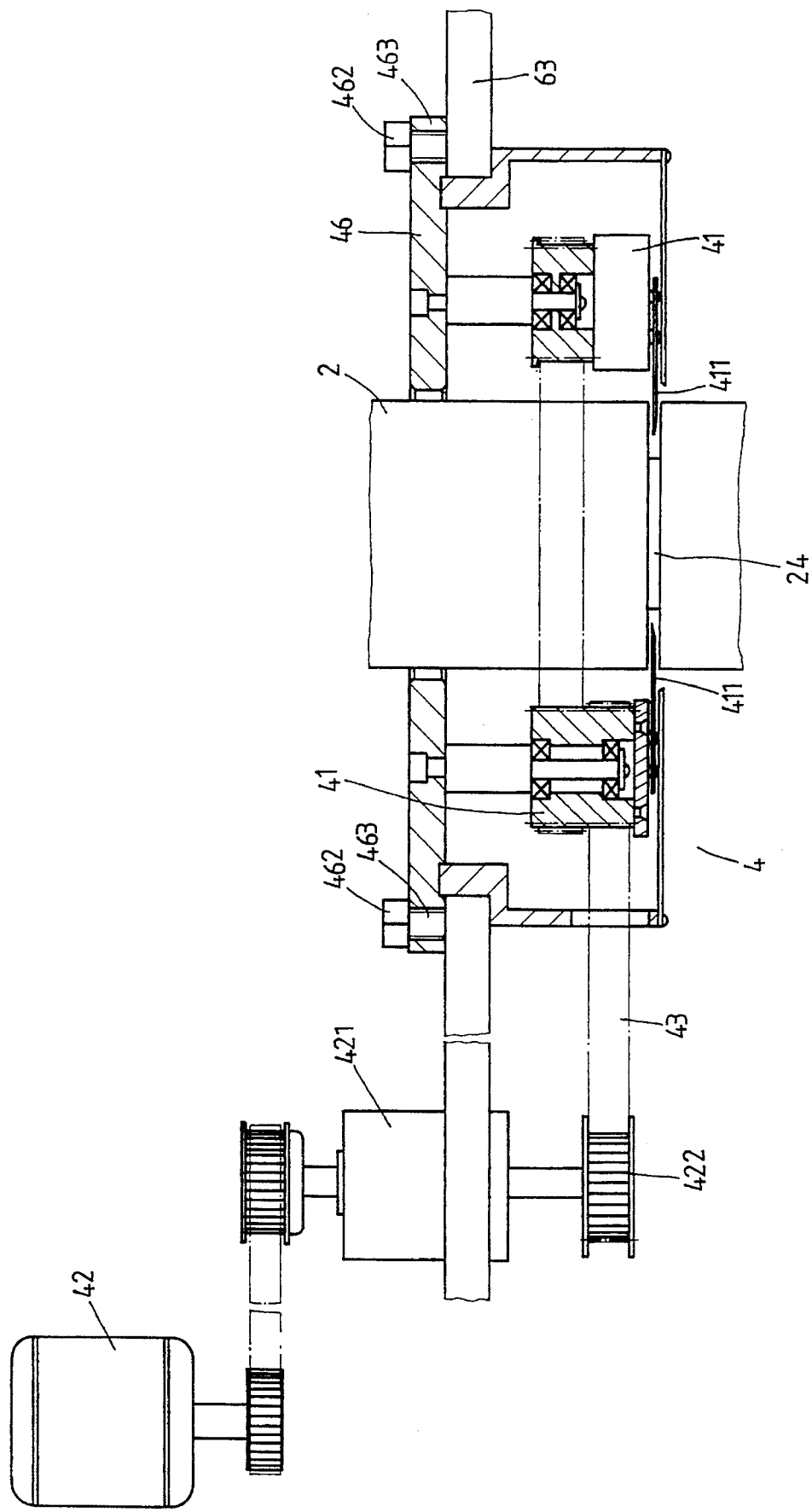
FIG. 7 is a longitudinally sectioned view of the cutter system.
Figure 8:
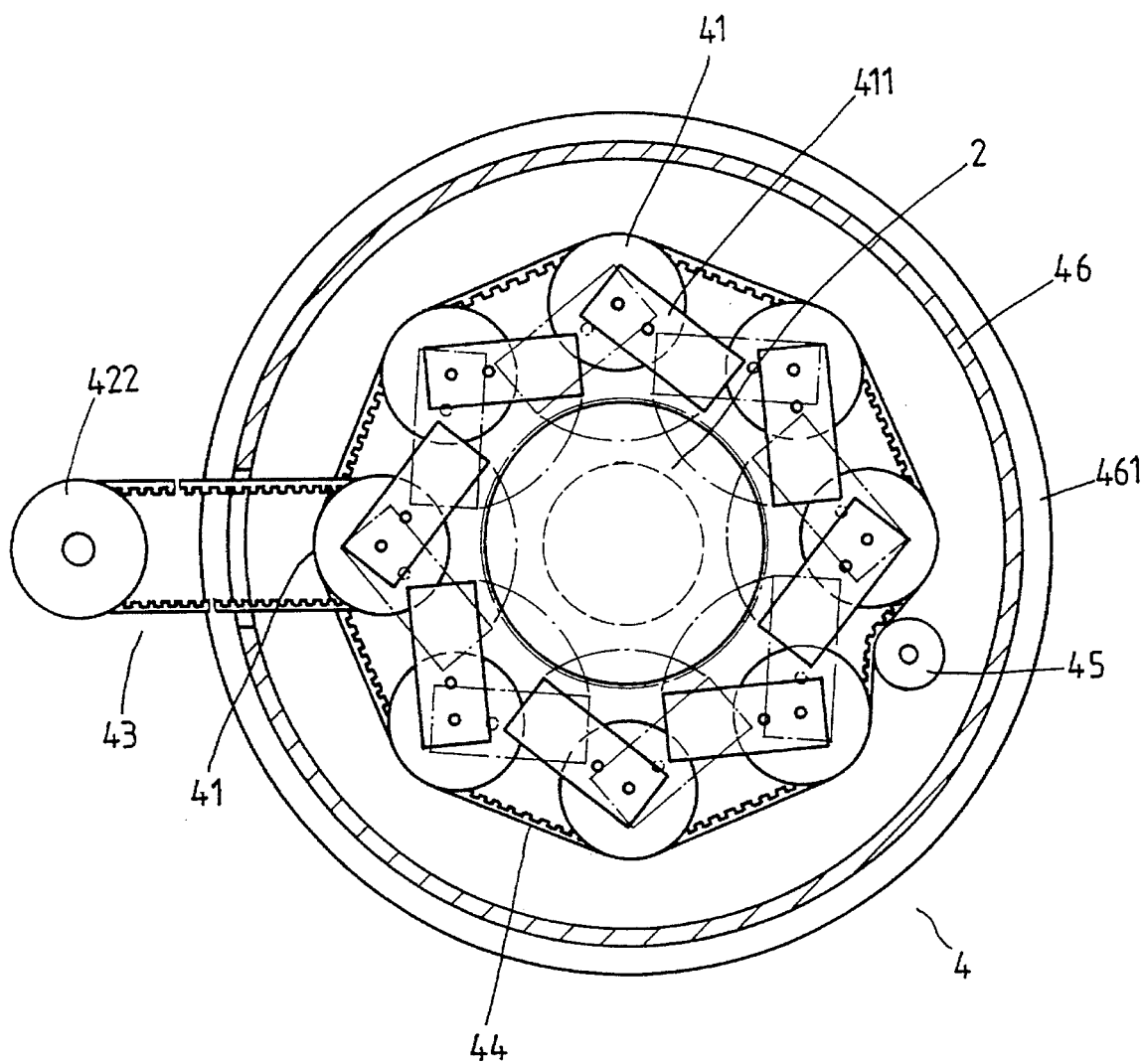
FIG. 8 is an illustration of the cutter system in operation.

The cutter system 4, as illustrated in FIGS. 6, 7 and 8, is comprised of the motor 42 and its clutch brake 421 disposed on the double-level deck 63 and components disposed within the barrel 46 driven by a pulley 422. The barrel 46 is in drum type structure with a cover, having an opening provided in the center to accommodate the central holder 2. An annular groove 461 is provided in the circumferential side of the barrel 46, and is snapped onto the inner edge of the opening 633 of the lower level of the double-level deck 63. The barrel 46 is secured by a pair of fasteners 462. Inside the barrel 46, a plurality of pulleys 41 are distributed about the periphery, with each pulley having a blade 411 affixed thereto, and a timing belt 44 externally connected thereto. One pulley 41 is further driven by a timing belt 43 that is coupled to the motor 42, with an idle gear 45 tensioning the timing belt 44 to achieve close contact and drive the pulleys 41, allowing the blades 411 to make fast circumferential cuts. As the motor 42 operates continuously, the blades 411 complete one cycle when the clutch brake 421 is applied, providing the power to activate the cycle. The edge of the blades cut through the shrinkable label within the groove 24 of the central holder 2, while the overlapped cutting angle of each blade 411 forms a ring of proper width to attain a neat cut instantly on the shrinkable label.

Figure 9:
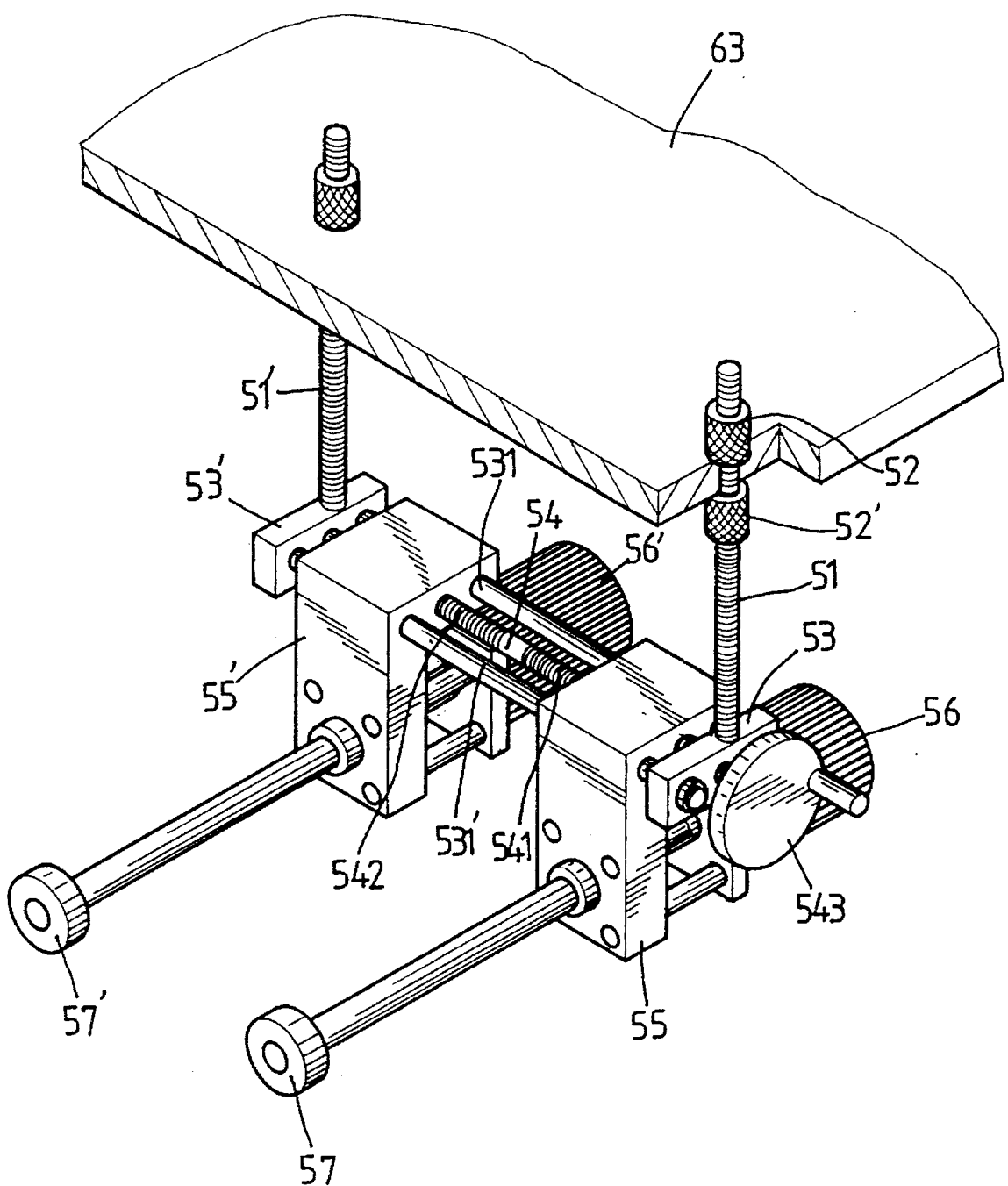
FIG. 9 is an isometric drawing of the loading system.

As illustrated in FIG. 9, the loading system 5 is comprised of two screws 51 and 51' located beneath the double-level deck 63 with each screw being secured with two nuts 52 and 52' at an upper end thereof. Blocks 53 and 53' are fixed to the lower ends of screws 51 and 51' respectively, so that the elevation of blocks 53 and 53' can be adjusted by changing the position of nuts 52 and 52' on each screw 51, 51'. Two guides 531 and 531' are respectively fixed to blocks 53 and 53' and a screw 54 extends between blades 53 and 53' and is pivotally coupled thereto. Screw 54 is provided with both a right-hand and a left-hand thread 541 and 542, engaged respectively to hangers 55 and 55', each having corresponding threads. One end f the screw 54 is fixed to a hand wheel 543 which when turned rotates the screw 54 to cause both hangers to move either towards or away from each other. Motors 56 and 56' are respectively fixed to the hangers 55, 55' and directly coupled to a respective loading roller 57, 57', which rollers correspond to bearings 232 of the central holder 2 (FIG. 3). Furthermore, an electric eye set 65 is provided to the left side and below the double-level deck 63 (FIG. 1), to detect the introduction of the bottle 9.

Figure 10:
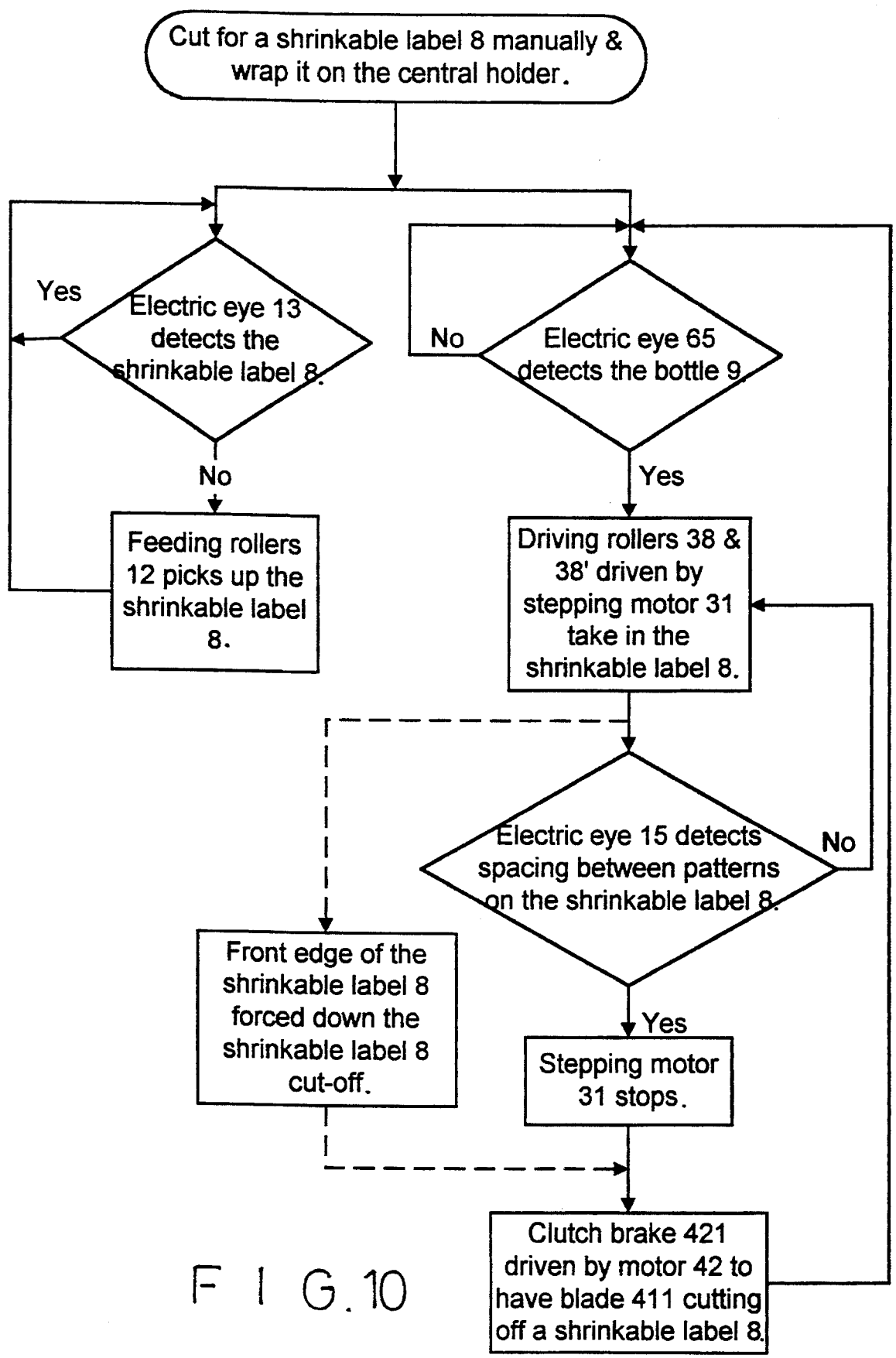
FIG. 10 is an operation flow chart of the present invention.
Figure 11A:
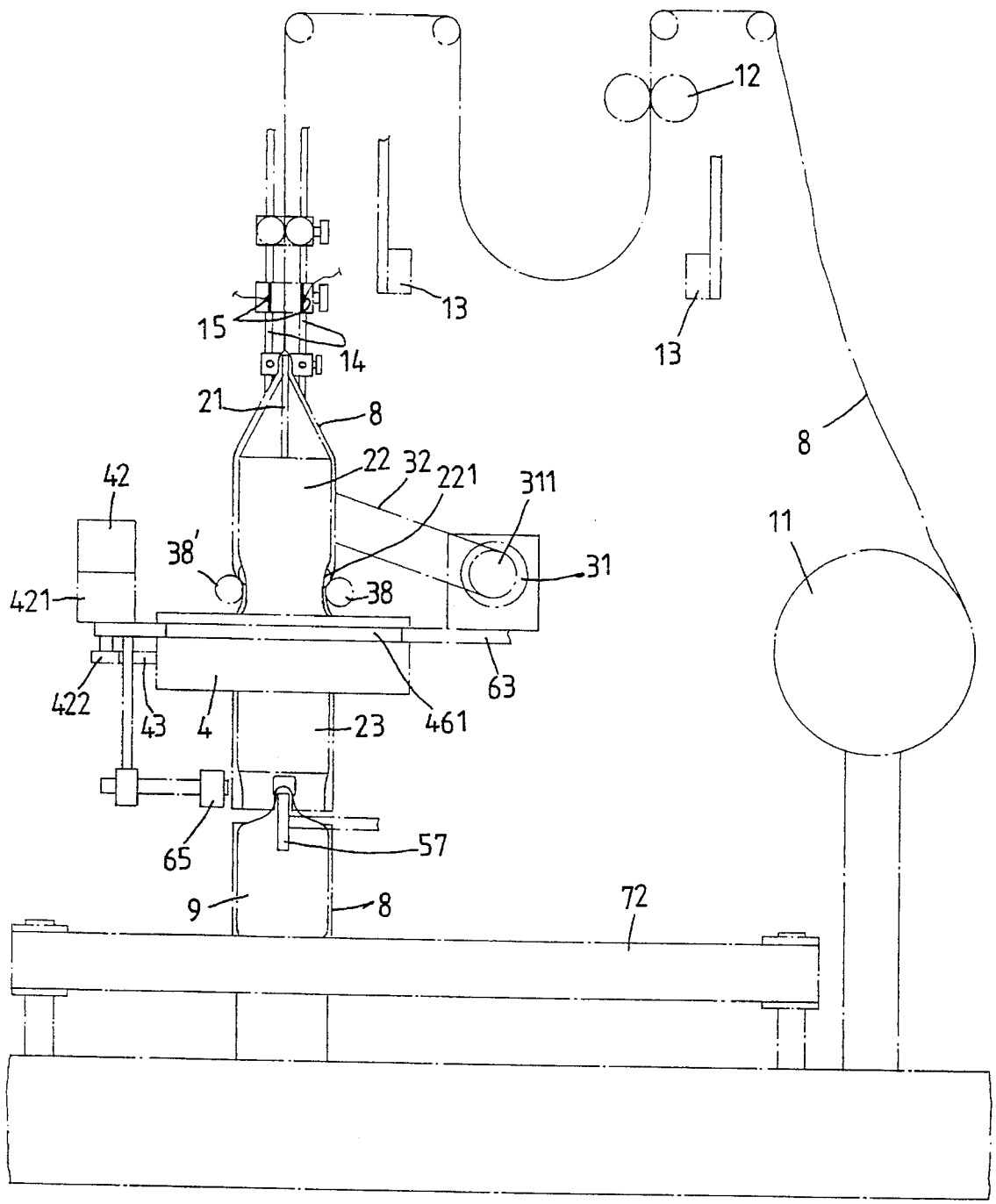
FIG. 11A is a front elevation view of the present invention in operation.
Figure 11B:
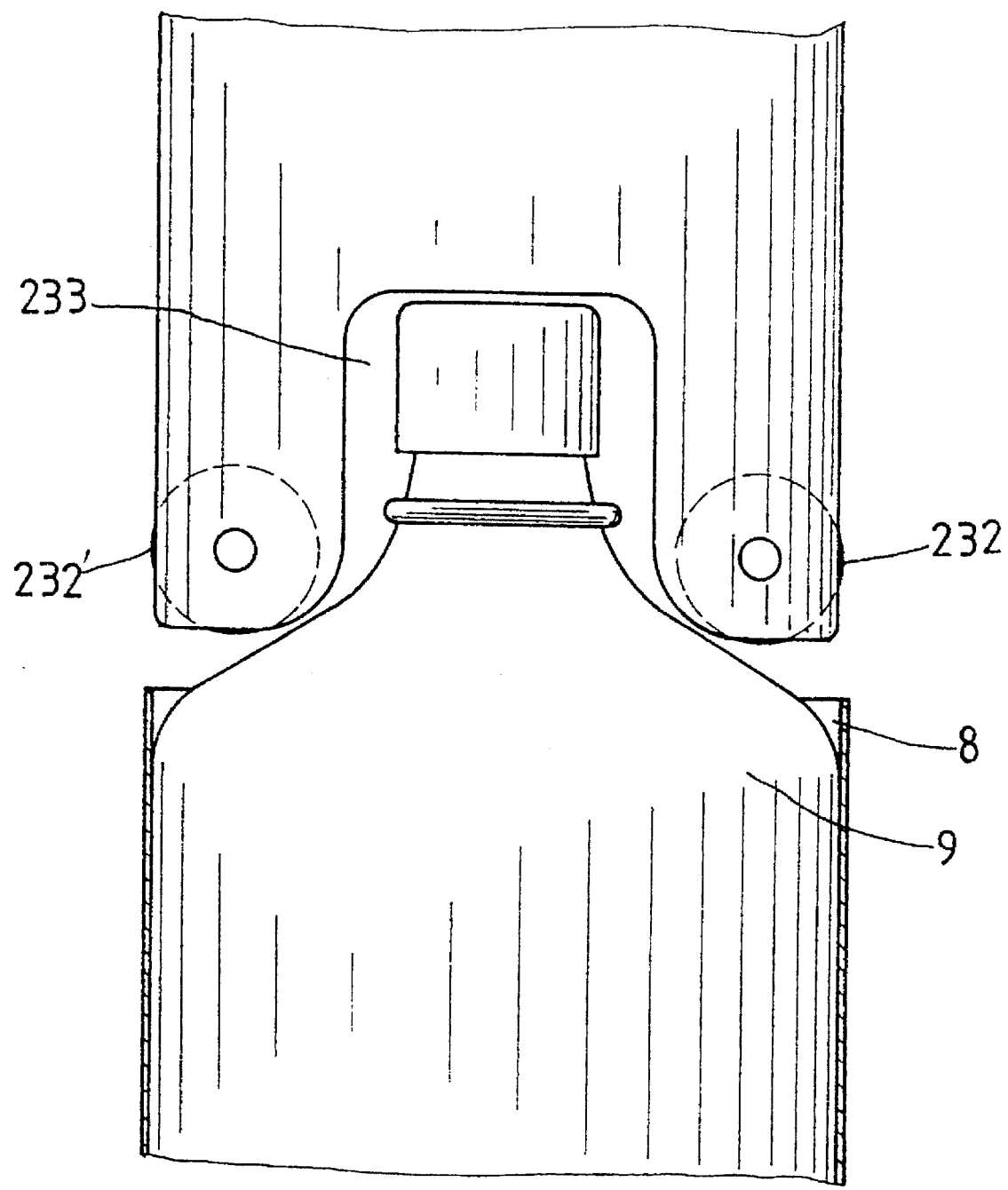
FIG. 11B is a side view of the bottom of the central holder in operation.
Figure 12A:
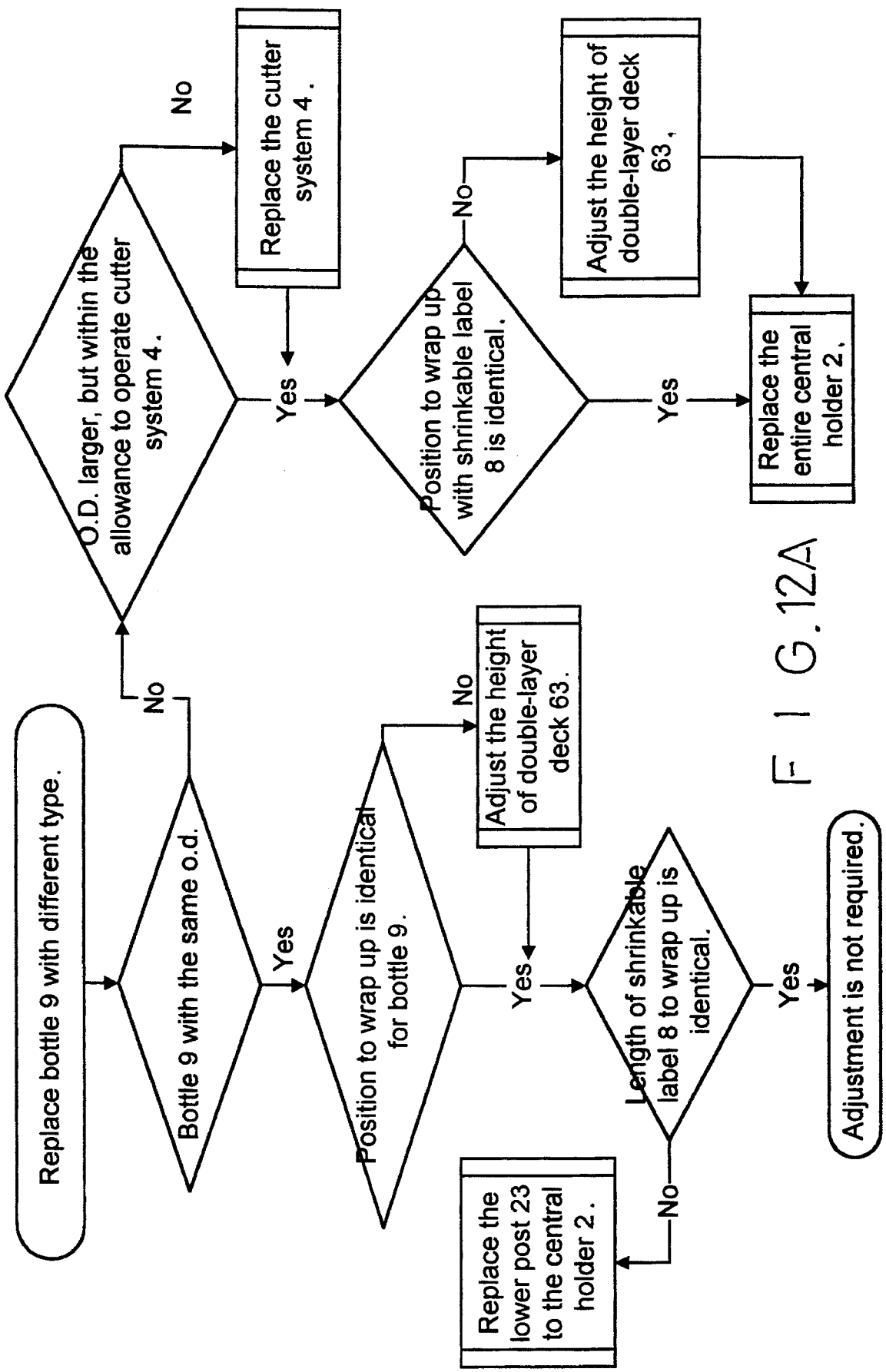
FIG. 12A is a main flow chart of the adjustment operation of the present invention.
Figure 12B:
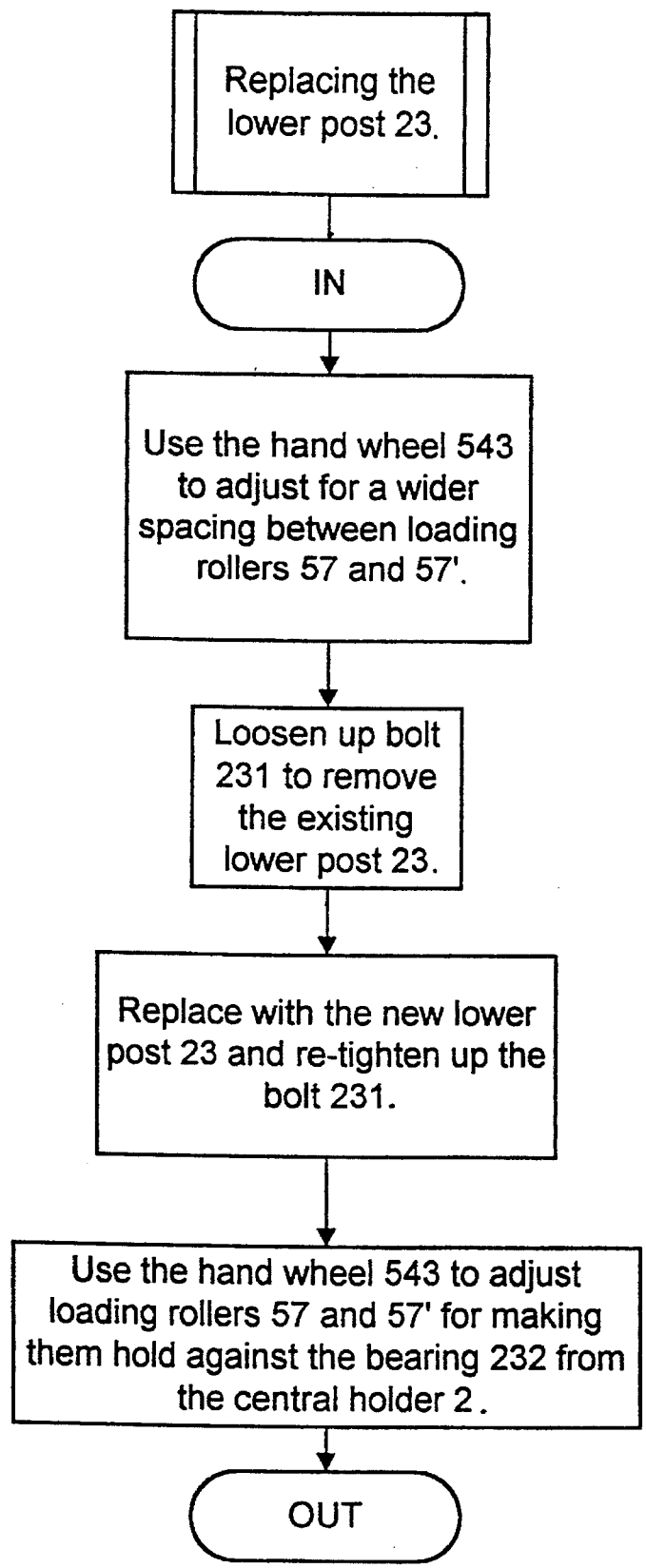
FIG. 12B is a sub-flow chart for replacement of the lower post.
Figure 12C:
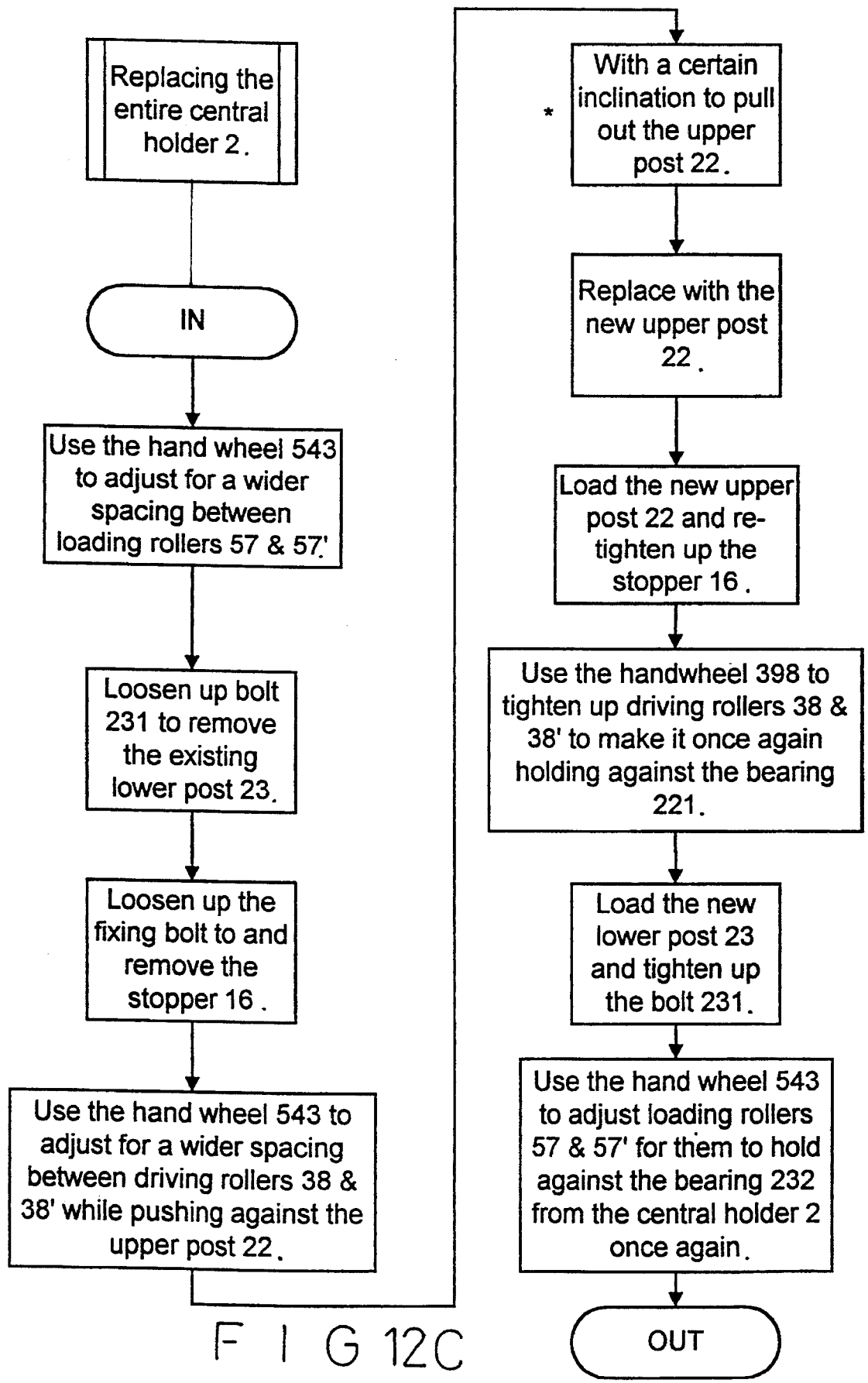
FIG. 12C is a sub-flow chart for replacement of the entire central holder.
Figure 12D:
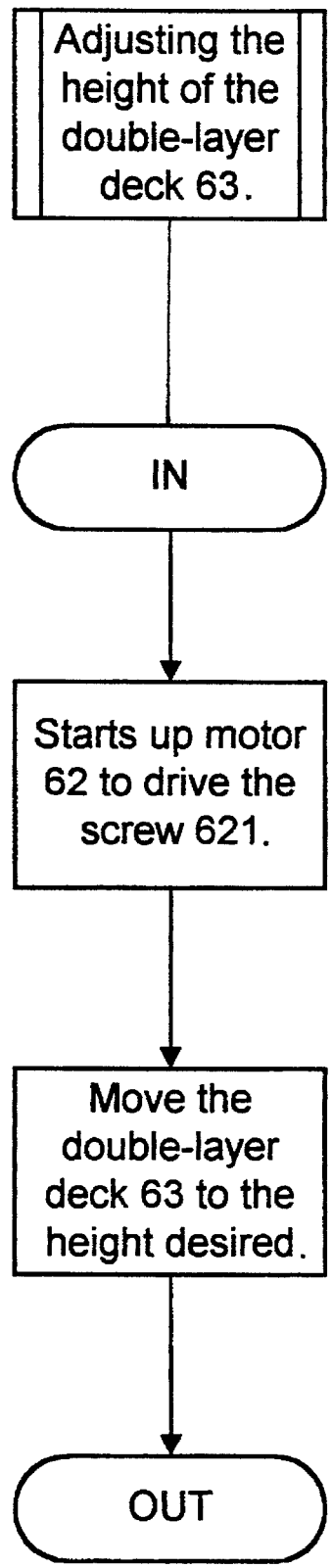
FIG. 12D is a sub-flow chart for adjustment of the double-layer deck.
Figure 12E:
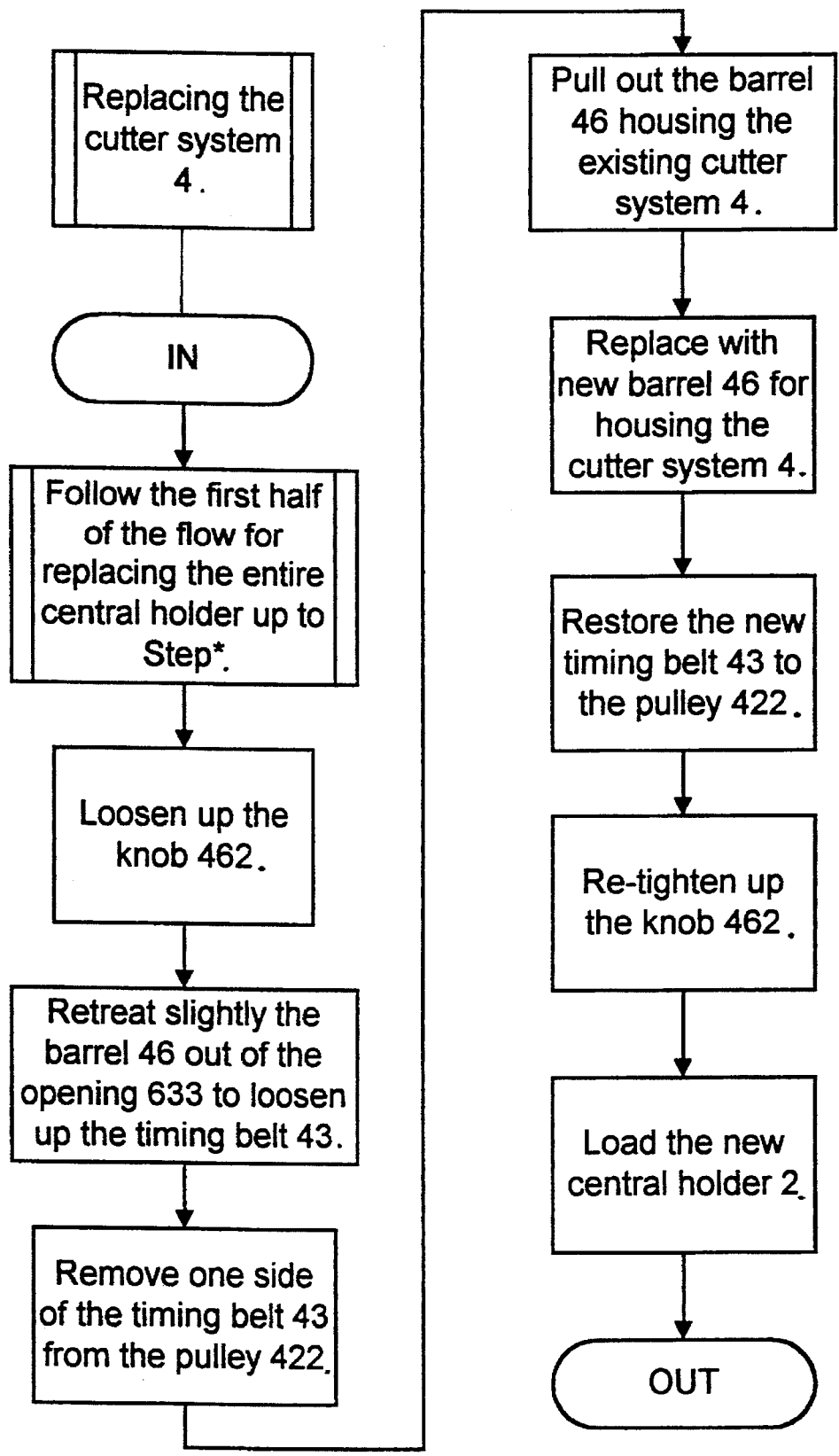
FIG. 12E is a sub-flow chart for replacement of the cutter system.

The shrinkable label 8, as illustrated in FIGS. 10, 11A and 11B, is pulled out of the let-off device 11 by feeding rollers 12, and stops once the looped rotation is detected by the electric eye 13. Once the bottom of the loop is reduced, so as to rise above the electric eye 13, the feeding rollers 12 are driven once again to assure the maintenance of a certain excessive amount of shrinkable label 8 on the positioning device 14 and allowing for automatic roll-down by the driving rollers 38 and 38'. The automatic operation cycle is achieved after the shrinkable label 8 is properly cut for one section in the central holder 2.

Bottle 9 entering into the tunnel 233, below the central holder 2, is picked up by the electric eye 65, which in turn sends out signals to the stepping motor 31 to activate driving rollers 38 and 38' for feeding the section of shrinkable label 8 that is finished, being cut. The cut section is forced down from the front edge of the entire roll of shrinkable label 8 and is stopped by the upper edge of the positioning belt 72. The step motor stops operation and promptly activates the clutch brake 421 of the cutter system 4, for the blades 411 (see FIG. 8) to cut off the shrinkable label 8, and the aforesaid operation is repeated once another bottle 9 is picked up by the electric eye 65.

The present invention offers the advantage of reducing operation time, as the operation of feeding from the entire roll of shrinkable label 8 and positioning on the bottle 9 of the cut shrinkable label 8 is done in an overlapped mode, instead of a linear arrangement to save at least half of the operation time. Further time saving can be achieved by the requirement for only a small rotation angle for the blades 411 of the cutter system 4 of the present invention to completely cut off the shrinkable label 8. Disregarding the time taken for troubleshooting, in case of failure by the prior art shrinkable label inserting machine, the time required for an operation cycle to label a bottle 9 taken by the present invention would require only 20%–25% of that usually consumed by the prior art.

Figures 14A, 14B:
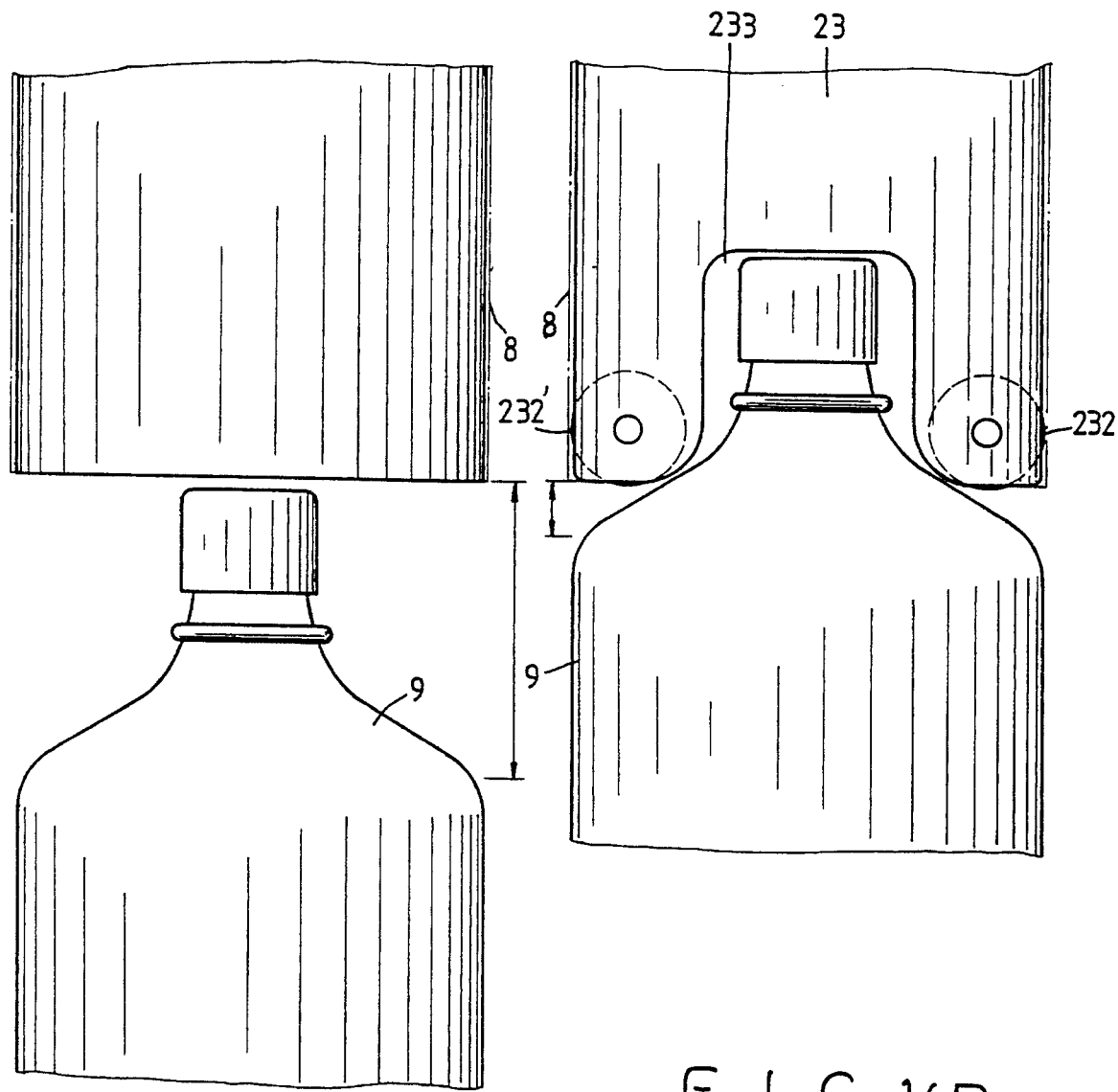
FIG. 14A is a side elevation view of the bottom of the central holder of the prior art.
FIG. 14B is a side elevation view of the bottom of the central holder of the present invention.
Figure 15:
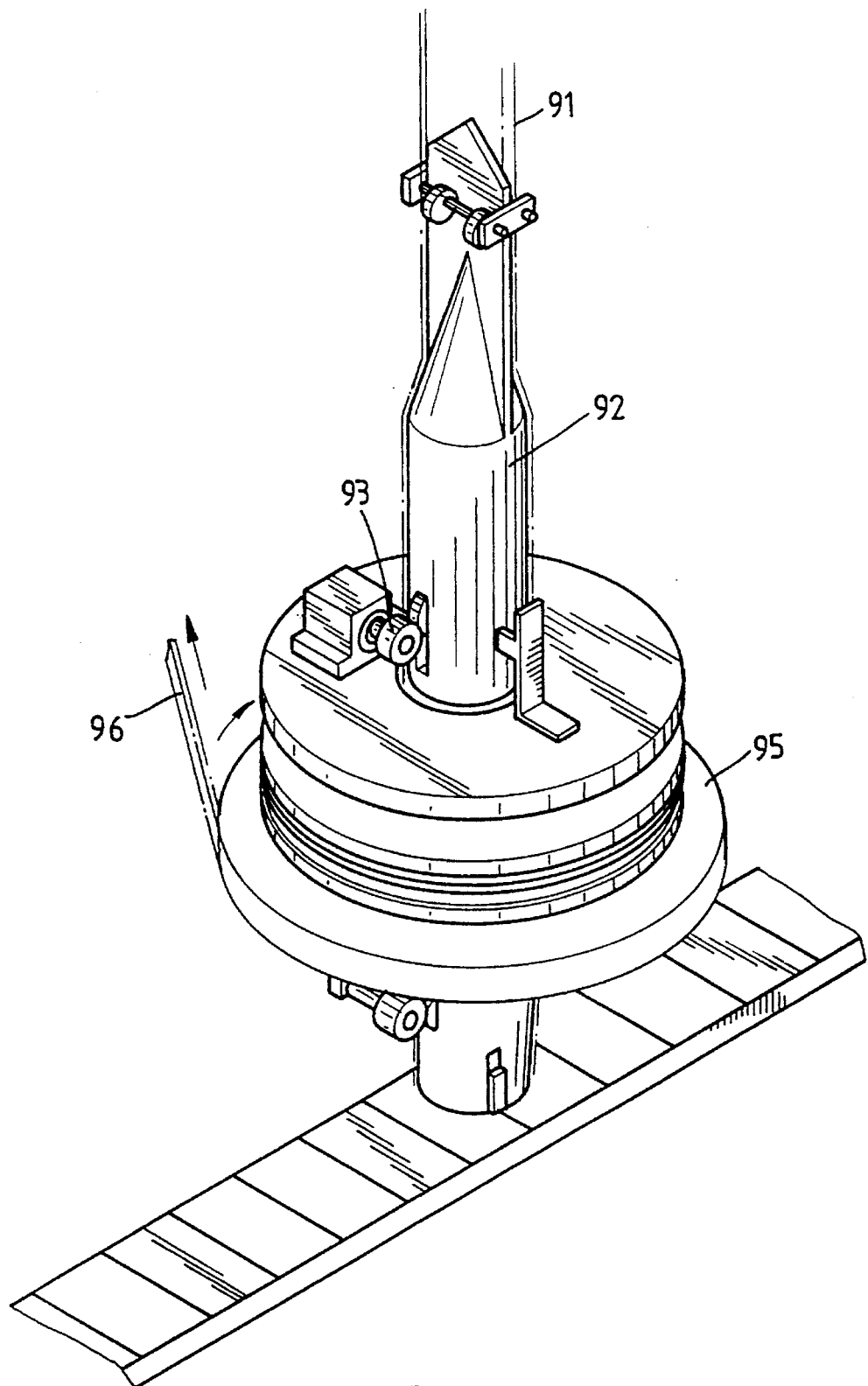
FIG. 15 is an isometric drawing of a prior art system.
Figure 16:
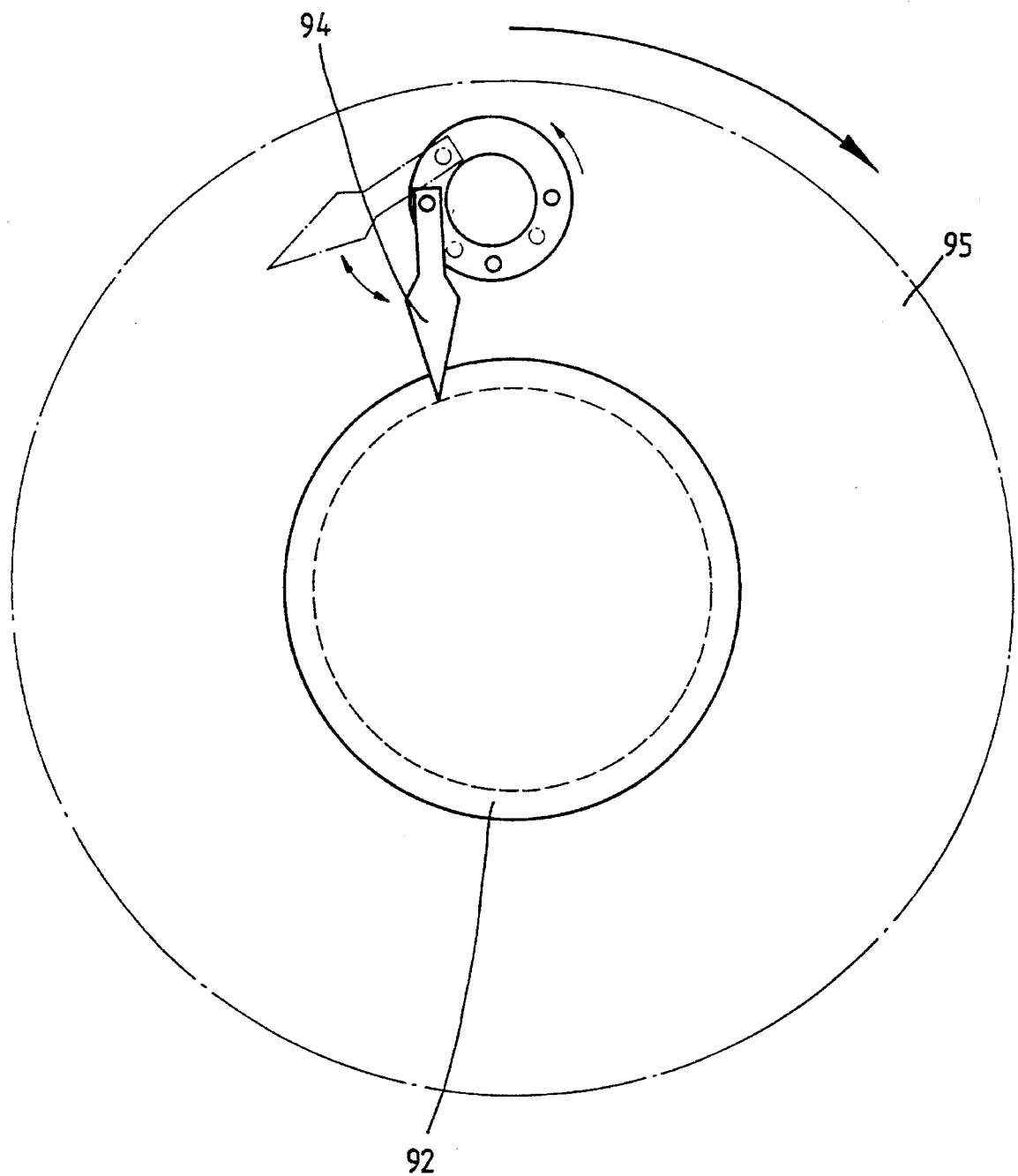
FIG. 16 is an illustration showing the operation of the prior art system.

Furthermore, the present invention provides the following advantages in operation. It is practically trouble free with an assured shrinkable label insertion, since the loading rollers 57 and 57' are provided outside of the bottle 9. As shown from the comparison in FIGS. 14A and 14B, both loading rollers 57 and 57' of the present invention are disposed closer to the bottle 9 and the shrinkable label 8 has already overlaid the upper section of the bottle 9 once the shrinkable label 8 passes the tunnel 233 of the central holder 2.

Figures 13A, 13B:
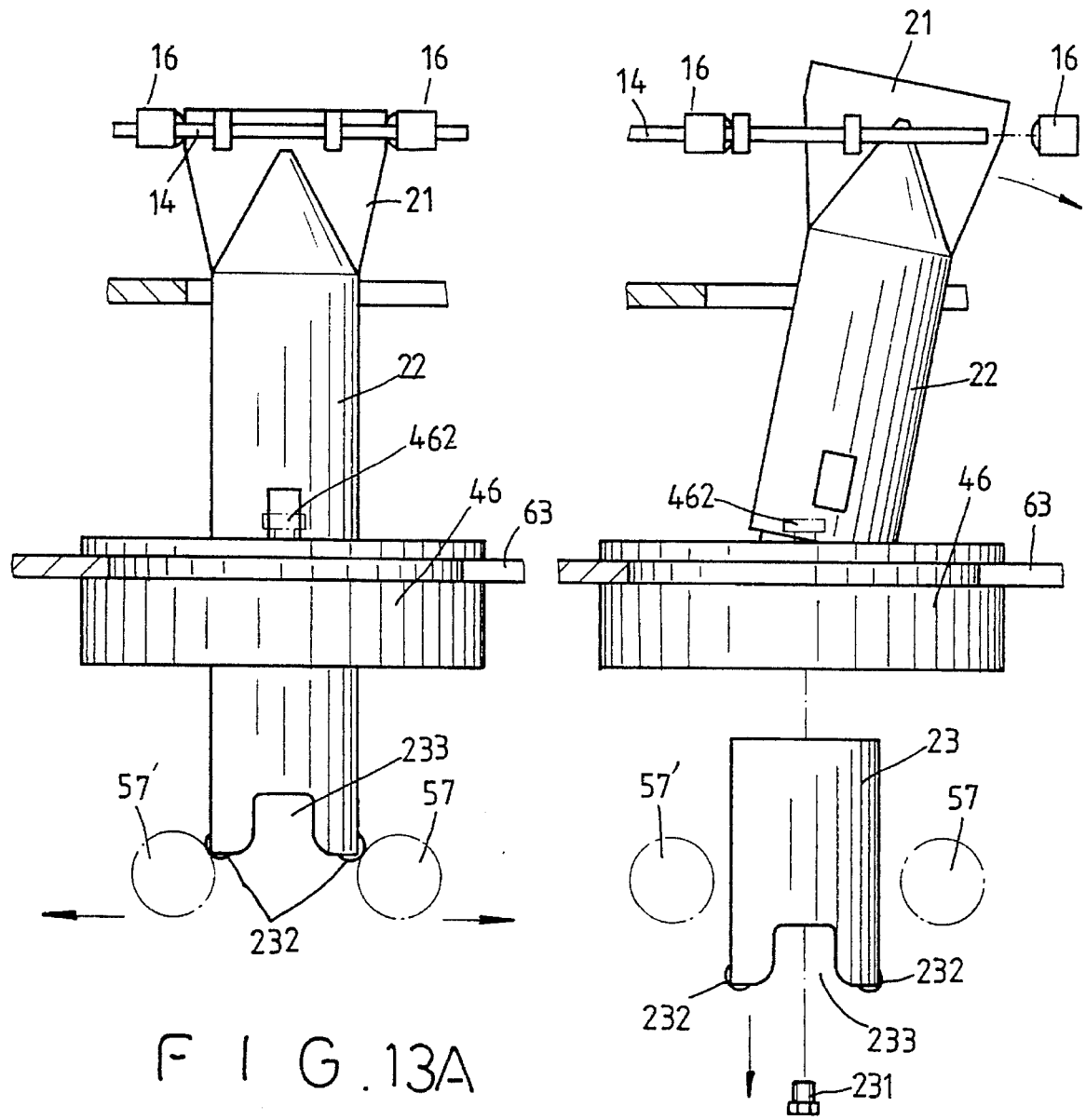
FIG. 13A is an illustration of the central holder in its normal mode.
FIG. 13B is an illustration showing the operation of replacing the central holder.

In addition, the cutter system 4 of the present invention is of modular design, that is, within the cyclic cutting of each blade 411, as illustrated in FIG. 8, there is a considerable range of diameters of the shrinkable label 8 that can be precisely cut off. Therefore, only the replacement of the central holder 2 is required, without replacing the cutter system 4 for a bottle 9 with a different outer diameter within such range of blades 411. In case the label with different length is to be positioned on a bottle 9 of the same outer diameter, only the replacement of the lower post 23 of the central holder 2 is required. Of course, adjustment of the double-level deck 63 and the loading system 5 may be required when labels of different lengths are involved. Details of such adjustment are illustrated in FIGS. 12A, 12B, 12C, 12D and 12E. Adjustment and requirements may vary as the case may be. It only takes turning of the hand wheel 543 to loosen both loading rollers 57 and 57', and loosening of the bolt 231 to remove the lower post 23, if the replacement of the lower post 23 of the central holder 2 is required, as illustrated in FIGS. 13A and 13B. If the replacement of the upper post 22 is required, the stopper 16 must be removed first before loosening driving rollers 38 and 38' to retract the upper post 22 to an inclined position. With the exception of the bolt 231, there is no need for any tools for replacing the central holder 2 of the present invention. No tool is required for replacing the cutter system 4, as it only takes turning of the hand knob portion of fasteners, and use of one's hand to partially pull out the barrel 46, pull out the timing belt 3 from pulley 422 for removing the barrel 46 to effect the replacement.

As for the adjustments, even such for the elevation of the double-level deck 63 relative to the loading rollers 57 and 57', can be made by manually providing friction to both nuts 52 and 52'. Such can be made easier by having them made in the shape of knob portion of fasteners 462.

I claim:

1. A machine for applying shrinkable labels to containers, comprising:

a support frame having a deck portion vertically displaceable thereon, said deck portion having a centrally disposed opening formed therein;

label feed means coupled to said frame for feeding a continuous web of tubular shrinkable labels in a flat condition from a roll thereof;

a central holder disposed above a bottle to be labeled and coupled to said frame for passage of said continuous web of tubular shrinkable labels thereover, said central holder passing through said opening formed in said deck portion and having an upper portion adapted to unflatten said continuous web of tubular shrinkable labels as said continuous web is displaced over said central holder, said central holder having an annular groove formed therein;

means for cutting a tubular label section from said continuous web of tubular shrinkable labels coupled to said deck portion and surrounding said central holder, said cutting means including (1) a plurality of pulleys circularly arranged about an intermediate portion of said central holder, said plurality of pulleys being defined by a first pulley and a plurality of second pulleys, (2) a drive motor coupled to said deck portion, (3) a first drive belt rotatably coupling said first pulley to said drive motor, (4) a second drive belt extending about said plurality of pulleys for rotation of said second pulleys responsive to rotation of said first pulley, and (5) a plurality of cutting blades respectively coupled to said plurality of pulleys, each of said plurality of cutting blades having a cutting arc disposed in aligned relationship with said annular groove of said central holder and in overlapping relationship with adjacent other of said plurality of cutting blades;

a driving system coupled to said deck portion above said cutting means and contacting said central holder for displacing said continuous web of tubular shrinkable labels on said central holder to said cutting means;

a loading system coupled to said frame below said cutting means and contacting said central holder for displacing said tubular label section cut from said continuous web onto the bottle to be labeled; and, means for conveying bottles coupled to said frame.

2. The machine as recited in claim 1 where said label feed means includes first electric eye means for monitoring a length of a loop of said continuous web of tubular shrinkable labels and second electric eye means for detecting a position of a printed pattern on said continuous web of tubular shrinkable labels.

3. The machine as recited in claim 1 where said driving system includes a first hand wheel for adjusting a distance between a first pair of rollers, said first pair of rollers being disposed on opposing sides of said central holder for contact with said continuous web of tubular shrinkable labels.

4. The machine as recited in claim 1 where said loading system includes a second hand wheel for adjusting a distance between a second pair of rollers, said second pair of rollers being disposed on opposing sides of said central holder for contact with said tubular label section cut from said continuous web of tubular shrinkable labels.

\* \* \* \* \*